US008846270B2

(12) United States Patent
Narendar

(10) Patent No.: US 8,846,270 B2
(45) Date of Patent: Sep. 30, 2014

(54) TITANATE AND METAL INTERCONNECTS FOR SOLID OXIDE FUEL CELLS

(71) Applicant: Yeshwanth Narendar, Westford, MA (US)

(72) Inventor: Yeshwanth Narendar, Westford, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 14/014,215

(22) Filed: Aug. 29, 2013

(65) Prior Publication Data
US 2013/0344412 A1 Dec. 26, 2013

Related U.S. Application Data

(63) Continuation of application No. 12/005,655, filed on Dec. 27, 2007.

(60) Provisional application No. 60/877,503, filed on Dec. 28, 2006, provisional application No. 60/877,504, filed on Dec. 28, 2006.

(51) Int. Cl.
H01M 8/02 (2006.01)
(52) U.S. Cl.
CPC .......... H01M 8/0217 (2013.01); H01M 8/0228 (2013.01); H01M 8/0208 (2013.01); H01M 8/0202 (2013.01); H01M 8/0206 (2013.01); H01M 8/0223 (2013.01); H01M 8/0215 (2013.01); Y02E 60/50 (2013.01)
USPC ........... 429/518; 429/457; 429/486; 429/488; 429/495

(58) Field of Classification Search
CPC ............ H01M 8/0215; H01M 8/0217; H01M 8/0226; H01M 8/02288; H01M 8/0202; H01M 8/0206; H01M 8/0208; H01M 8/0223; H01M 8/0228
USPC .......................... 429/457, 486, 488, 495, 518
See application file for complete search history.

(56) References Cited

U.S. PATENT DOCUMENTS

| 4,913,982 | A | 4/1990 | Kotchik et al. |
| 5,330,859 | A | 7/1994 | McPheeters et al. |
| 5,639,572 | A | 6/1997 | Mori et al. |
| 5,807,642 | A | 9/1998 | Xue et al. |
| 5,958,304 | A | 9/1999 | Khandkar et al. |
| 6,106,967 | A | 8/2000 | Virkar et al. |
| 6,228,520 | B1 | 5/2001 | Chiao |
| 6,737,182 | B2 | 5/2004 | Keegan |
| 2003/0175573 | A1 | 9/2003 | Yoo et al. |
| 2004/0001994 | A1 | 1/2004 | Marina et al. |
| 2006/0147778 | A1 | 7/2006 | Matsuzaki et al. |
| 2007/0009784 | A1 | 1/2007 | Pal et al. |
| 2007/0237999 | A1 | 10/2007 | Donahue et al. |
| 2008/0081223 | A1 | 4/2008 | Yasumoto et al. |

FOREIGN PATENT DOCUMENTS

| EP | 0 896 378 A1 | 2/1999 |
| EP | 1 603 183 A1 | 12/2005 |
| EP | 1 788 653 A1 | 5/2007 |
| JP | 2003276565 A | 10/2003 |
| JP | 2003288919 A | 10/2003 |
| WO | 02/41434 A1 | 5/2002 |
| WO | 2004082058 | 9/2004 |
| WO | 2006/016628 A1 | 2/2006 |

OTHER PUBLICATIONS

Wenhua Huang, and Srikanth Gopalan, "Bi-layer structures as solid oxide fuel cell interconnections," Journal of Power Sources 154 (2006) 180-183.
Shiqiang Hui, and Anthony Petric, "Evaluation of yttrium-doped SrTiO3 as an anode for solid oxide fuel cells," Journal of the European Ceramic Society 22 (2002) 1673-1681.
Keegan C. Wincewicz, and Joyce S. Cooper, "Taxonomies of SOFC material and manufacturing alternatives," Journal of Power Sources 140 (2005) 280-296.
Zhu, W.Z. et al., "Development of interconnect materials for solid oxide fuel cells," Materials Science and Engineering A348, pp. 227-243 (2003).
Hoshimoto et al., "A study on the structural and electrical properties of lanthanum-doped strontium titanate prepared in air," Journal of Alloys and Compounds 397 (2005) 245-249.
Canales-Vasquez, J. et al., "Electrical Properties in La2Sr4Ti6O19-δ; a potential anode for high temperature fuel cells," Solid State Ionics, 159:159-165 (2003).
Horikiri, F. et al., "Electrical Properties of Nb-Doped SrTiO3 Ceramics with Excess TiO2 for SOFC anodes and Interconnects," Journal of Electrochemical Society, 155(1): B16-B20 (2008).
Hui, S. and Petric, A., "Electrical conductivity of Yttruim-doped SrTiO3: Influence of Transition Metal Additives," Materials and Research Bulletin 37:1215-1231 (2002).
Kawada, T., et al. "Fabrication of a Planar Solid Oxide Fuel Cell by Tape-Casting and Co-Firing Method," J. Ceramic Soc. of Japan, 100(60):847-850 (1992) (English Abstract).

(Continued)

Primary Examiner — Ladan Mohaddes
(74) Attorney, Agent, or Firm — Robert N. Young; Abel Law Group, LLP

(57) ABSTRACT

A solid oxide fuel cell (SOFC) includes a plurality of sub-cells. Each sub-cell includes a first electrode in fluid communication with a source of oxygen gas, a second electrode in fluid communication with a source of a fuel gas, and a solid electrolyte between the first electrode and the second electrode. The SOFC further includes an interconnect between the sub-cells. In one embodiment, the SOFC has a first surface in contact with the first electrode of each sub-cell and a second surface that is in contact with the second electrode of each sub-cell; and the interconnect consists essentially of a doped M-titanate based perovskite, wherein M is an alkaline earth metal. In another embodiment, the interconnect includes a first layer in contact with the first electrode of each sub-cell, and a second layer in contact with the second electrode of each sub-cell. The first layer includes an electrically conductive material selected from the group consisting of an metal, a metal alloy and a mixture thereof. The second layer includes a doped M-titanate based perovskite, wherein M is an alkaline earth metal. A solid oxide fuel cell described above is formed by connecting each of the sub-cells with an interconnect described above.

19 Claims, 2 Drawing Sheets

(56) References Cited

OTHER PUBLICATIONS

Kolodiazhnyi, T. and Petric, A., "The Applicability of Sr-deficient n-type SrTiO3 for SOFC Anodes," Journal of Electroceramics, 15:5-11 (2005).

Liu, Z. et al., "Planar SOFC Stack with Low-Cost Multi-Layer Ceramic Interconnect," International Symposium on Solid Oxide Fuel Cells No. 9, vol. 7 (2) Quebec, Canada (May 2005).

Notification of Transmittal of the International Search Report and Written Opinion for PCT/US2007/026356 mailed Oct. 7, 2008, 5 pages.

Raymond, M.V., and Amarakoon, V.R.W., "Microstructure and Electrical Properties of Chemically Prepared Nb2O5-Doped SrTiO3 Ceramics," J. Am. Ceram. Soc., 73(5):1308-1311 (1990).

Sakai, N., et al., "Sinterability and electrical conductivity of Calcium-Doped Lanthanum Chromites," J. mater. Sci., 25:4531-4534 (1990).

Simner, S.P. et al., "Development of Lanthanum Ferrite SOFC Cathodes," J. Power Sources 113:1-10 (2003).

Singhal S.C. and Kendall, K., "Introduction to SOFCs," In High Temperature Solid Oxide Fuel Cells: Fundamentals, Design and Applications, Singhal & Kendall, eds. (UK:Elsevier Advanced Technology), Ch. 1 pp. 1-22 (2003).

Slater, P.R. et al., "Synthesis and Electrical Characterization of Doped Perovskite Titanates as Potential Anode Materials for Solid Oxide Fuel Cells," J. Mater. chem., 7(12):2495-3498 (1997).

Yang Z., "Recent Advances in Metallic Interconnects for Solik Oxide Fuel Cells," International materials Review, 53 (1):39-54 (2008).

Sakai, N. et al., "Lanthanum Chromite-Based Interconnects as Key Materials for SOFC Stack Development," Int. J. Appl. Ceram. Technol., 1(1):23-30 (2004).

Minh, N. Q. et al., "Fabrication and Characterization of Monolithic Solid Oxide Fuel Cells," In:IECEC-90; Proceedings of the 25th Intersociety Energy Conversion Engineering Conference, Reno, NV, vol. 3, pp. 230-234 (Aug. 1990).

Chick, L.A. et al., "Phase Transitions and Transient Liquid-Phase Sintering in Calcium-Substituted Lanthanum Chromite," J. Am. Ceram. Soc., 80(8):2109-2120 (199710.

Murphy, M.W. et al., "Tape Casting of Lanthanum Chromite," J. Am. Ceram. Soc., 80(1):165-170 (1997).

Carter, J.D. et al., "Reactions at the Calcium Doped Lanthanum Chromite-Yttria Stabilized Zirconia Interface," J. Solid State Chem., 122, Art. No. 0134, pp. 407-415 (1996).

Ghosh, S. et al., "Synthesis of La0.7Ca0.3Cr03 SOFC Interconnect Using a Chromium Source," Electrochem. and Solid-State Ltrs, 9(11):A516-A519 (2006).

Zhou, X. et al., "Preparation and Properties of Ceramic Interconnecting Materials, La0.7Ca0.3Cr3-8 Doped with GDC for IT-SOFCs," J. Power Sources, 162:279-285 (2006).

Zhong, Z., "Stoichiometric Lanthanum Chromite Based Ceramic Interconnects with Low Sintering Temperature," Solid State Ionics 177:757-764 (2006).

Fujita, K. et al., "Relationship Between Electrochemical Properties of SOFC Cathode and Composition of Oxide Layer Formed on Metallic Interconnects," J. Power Sources 131:270-277 (2004).

Simner, S.P. et al., "SOFC Performance with Fe—Cr—Mn Alloy Interconnect," J. Electrochem. Soc., 152(4):A740-A745 (2005).

Fergus, J. W., "Lanthanum Chromite-Based Materials for Solid Oxide Fuel Cell Interconnects," Solid State Ionics, 171:1-15 (2004).

Fu, Q.X. et al., "La0.4Sr0.6Ti1-xMnxO3-8 Perovskites as Anode Materials for Solid Oxide Fuel Cells," J. Electrochem. Soc. 153(4):D74-D83 (2006).

Hui, S. and Petric, A., "Electrical Properties of Yttrium-Doped Strontium Titanate Under Reducing Conditions," J. Electrochem. Soc., 149(1):J1-J10 (2002).

Hui, S. and Petric, A., "Evaluation of Yttrium-Doped SrTiO3 as an Anode for Solid Oxide Fuel Cells," J. Euro. Ceram. Soc., 22:1673-1681 (2002).

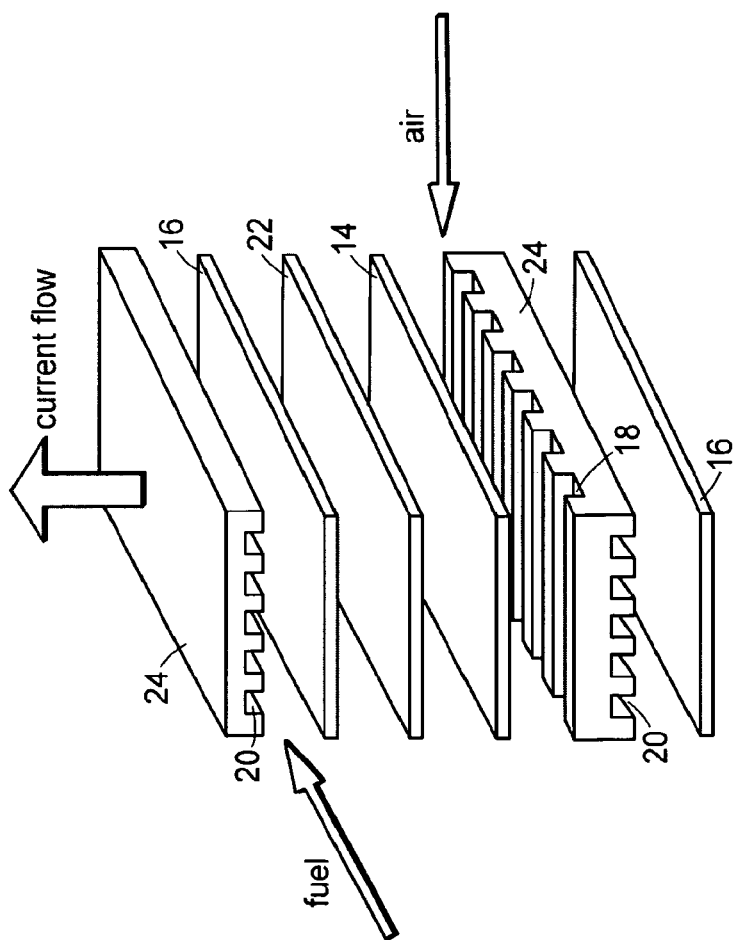
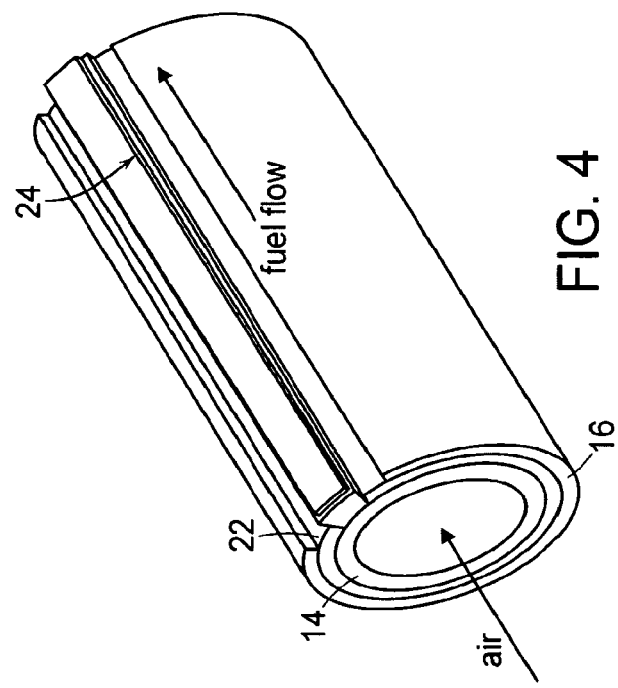
FIG. 3
FIG. 4

TITANATE AND METAL INTERCONNECTS FOR SOLID OXIDE FUEL CELLS

CROSS-REFERENCE TO RELATED APPLICATION(S)

The present application is a continuation application of U.S. patent application Ser. No. 12/005,655, filed Dec. 27, 2007 entitled "TITANATE AND METAL INTERCONNECTS FOR SOLID OXIDE FUEL CELLS," naming inventor Yeswanth Narendar, which claims priority from U.S. Provisional Application No. 60/877,503, filed Dec. 28, 2006, entitled "METAL INTERCONNECTS WITH TITANATE COATINGS FOR SOLID OXIDE FUEL CELLS," naming inventor Yeswanth Narendar, and U.S. Provisional Application No. 60/877,504, filed Dec. 28, 2006, entitled "TITANATE INTERCONNECTS FOR SOLID OXIDE FUEL CELLS," naming inventor Yeswanth Narendar, which applications are incorporated by reference herein in their entirety.

BACKGROUND

A fuel cell is a device that generates electricity by a chemical reaction. Among various fuel cells, solid oxide fuel cells use a hard, ceramic compound of metal (e.g., calcium or zirconium) oxide as an electrolyte. Typically, in the solid oxide fuel cells, an oxygen gas, such as $O_2$, is reduced to oxygen ions ($O^{2-}$) at the cathode, and a fuel gas, such as $H_2$ gas, is oxidized with the oxygen ions to from water at the anode.

Interconnects are one of the critical issues limiting commercialization of solid oxide fuel cells. Currently, most companies and researchers working with planar cells are using coated metal interconnects. For example, ferritic stainless steel based metal interconnects, such as Crofer 22 APU, and powder metallurgy formulations from Plansee AG in Austria, have good CTE (coefficient of thermal expansion) mismatch and good compatibility with solid oxide fuel cells. However, oxidation of metal interconnects during operation, thereby forming metal oxides, such as $Cr_2O_3$, and subsequent migration of metals of the metal oxides (e.g., chromium migration) to an electrode layer and/or electrode-electrolyte interface is one of the primary mechanisms leading to performance degradation in solid oxide fuel cells.

While metal interconnects are relatively easy to fabricate and process, they generally suffer from high power degradation rates (e.g. 10%/1,000 h) partly due to formation of metal oxide, such as $Cr_2O_3$, at an interconnect-anode/cathode interface during operation. Ceramic interconnects based on lanthanum chromites ($LaCrO_3$) have lower degradation rates than metal interconnects partly due to relatively high thermodynamic stability and low Cr vapor pressure of $LaCrO_3$ compared to $Cr_2O_3$ formed on interfaces of the metal interconnects and electrode. However, doped $LaCrO_3$ generally suffers from dimensional changes, such as warping or some other forms of distortion, and consequent seal failures in reducing conditions. Another issue related to $LaCrO_3$ is its relatively low sinterability.

Therefore, there is a need for development of new interconnects for solid oxide fuel cells, addressing one or more of the aforementioned problems.

SUMMARY OF THE INVENTION

The invention is directed to a solid oxide fuel cell (SOFC) that includes a plurality of sub-cells and to a method of preparing the SOFC. Each sub-cell includes a first electrode in fluid communication with a source of oxygen gas, a second electrode in fluid communication with a source of a fuel gas, and a solid electrolyte between the first electrode and the second electrode. The SOFC further includes an interconnect between the sub-cells.

In one embodiment, the interconnect has a first surface in contact with the first electrode of each sub-cell, and a second surface that is in contact with the second electrode of each sub-cell. The interconnect consists essentially of a doped M-titanate based perovskite, wherein M is an alkaline earth metal.

In another embodiment, the interconnect includes a first layer in contact with the first electrode of each sub-cell, and a second layer in contact with the second electrode of each sub-cell. The first layer includes an electrically conductive material selected from the group consisting of an metal, a metal alloy and a mixture thereof. The second layer includes a doped M-titanate based perovskite, wherein M is an alkaline earth metal.

The invention also includes a method of forming a solid oxide fuel cell described above. The method includes connecting each of the sub-cells with an interconnect described above.

It is believed that the doped M-titanates (e.g., $MTiO_3$) in the invention, particularly, n-doped M-titanates, such as n-doped $SrTiO_3$ or $CaTiO_3$, exhibit less oxygen vacancy formation during operation of SOFCs, as compared to conventional p-doped $LaCrO_3$, thereby limiting or eliminating lattice expansion problems associated with conventional p-doped $LaCrO_3$. In addition, the doped M-titanates can function as an effective oxidation barrier to thereby extend operation life of SOFCs.

BRIEF DESCRIPTION OF THE DRAWINGS

FIG. 3 is a schematic diagram of an embodiment of a fuel cell of the invention, having a planar, stacked design.

FIG. 4 is a schematic diagram of still another embodiment of a fuel cell of the invention, having a tubular design.

DESCRIPTION OF THE PREFERRED EMBODIMENT(S)

Figure 1:
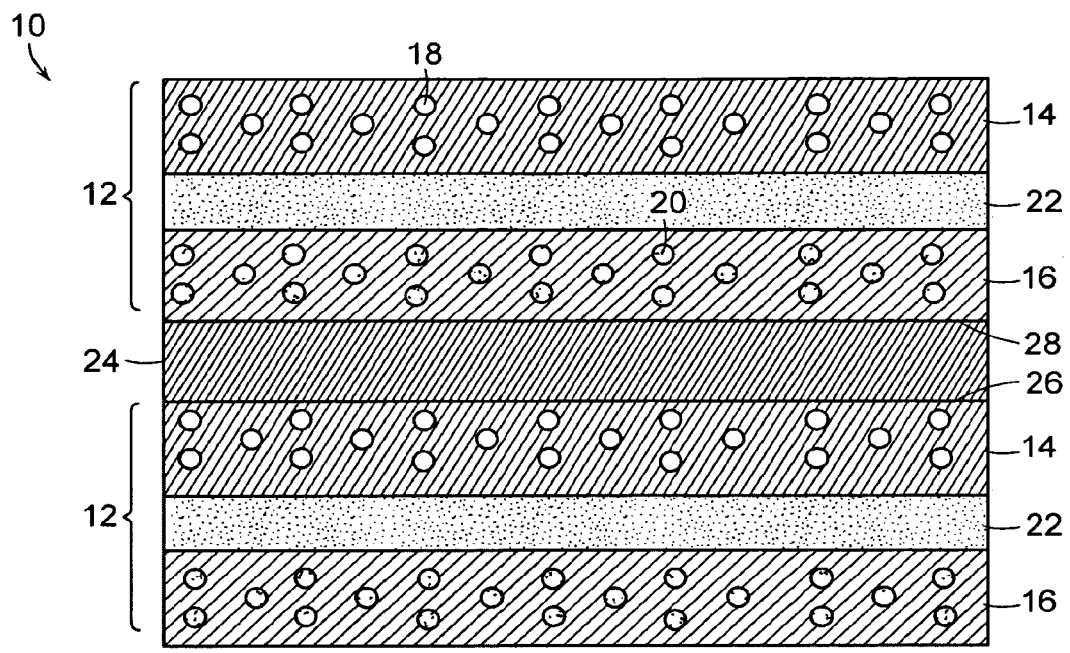
FIG. 1 is a schematic cross-sectional view of one embodiment of the invention.

The foregoing will be apparent from the following more particular description of example embodiments of the invention, as illustrated in the accompanying drawings in which like reference characters refer to the same parts throughout the different views. The drawing is not necessarily to scale, emphasis instead being placed upon illustrating embodiments of the present invention.

FIG. 1 shows fuel cell 10 of the invention. Fuel cell 10 includes a plurality of sub-cells 12. Each sub-cell 12 includes first electrode 14 and second electrode 16. Typically, first and second electrodes 14 and 16 are porous. In fuel cell 10, first electrode 14 at least in part defines a plurality of first gas channels 18 in fluid communication with a source of oxygen gas, such as air. Second electrode 16 at least in part defines a plurality of second gas channels 20 in fluid communication with a fuel gas source, such as $H_2$ gas or a natural gas which can be converted into $H_2$ in situ at second electrode 16.

Although, in FIG. 1, first electrodes 14 and second electrodes 16 define a plurality of gas channels 18 and 20, other types of gas channels, such as a microstructured channel (e.g, grooved channel) at each of the electrodes or as a separate layer in fluid communication with the electrode, can also be used in the invention. For example, referring to FIG. 2, first gas channel 18 is defined at least in part by first electrode 14 and by at least in part by interconnect 24, and second gas channel 20 is defined at least in part by second electrode 16 and by at least in part by interconnect 24.

Any suitable cathode materials known in the art can be used for first electrode 14, for example, in "High Temperature Solid Oxide Fuel Cells: Fundamentals, Design and Applications," pp. 119-143, Dinghal, et al. Ed., Elsevier Ltd. (2003), the entire teachings of which are incorporated herein by reference. In one embodiment, first electrode 14 includes a La-manganate (e.g, $La_{1-\alpha}MnO_3$, where $\alpha$ is equal to or greater than zero, and equal to or less than 0.1) or La-ferrite based material. Typically, the La-manganate or La-ferrite based material is doped with one or more suitable dopants, such as Sr, Ca, Ba, Mg, Ni, Co or Fe. Examples of doped La-manganate based materials include LaSr-manganates (LSM) (e.g., $La_{1-k}Sr_kMnO_3$, where k is equal to or greater than 0.1, and equal to or less than 0.3, (La+Sr)/Mn is in a range of between about 1.0 and about 0.95 (molar ratio)) and LaCa-manganates (e.g., $La_{1-k}Ca_kMnO_3$, k is equal to or greater than 0.1, and equal to or less than 0.3, (La+Ca)/Mn is in a range of between about 1.0 and about 0.95 (molar ratio)). Examples of doped La-ferrite based materials include LaSrCo-ferrite (LSCF) (e.g. $La_{1-q}Sr_qCo_{1-j}Fe_jO_3$, where each of q and j independently is equal to or greater than 0.1, and equal to or less than 0.4, (La+Sr)/(Fe+Co) is in a range of between about 1.0 and about 0.95 (molar ratio)). In one specific embodiment, first electrode 14 includes at least one of a LaSr-manganate (LSM) (e.g., $La_{1-k}Sr_k MnO_3$) and a LaSrCo-ferrite (LSCF). Common examples include $(La_{0.8}Sr_{0.2})_{0.98}MnO_{3+\delta}$ ($\delta$ is equal to or greater than zero, and equal to or less than 0.3) and $La_{0.6}Sr_{0.4}Co_{0.2}Fe_{0.8}O_3$.

Any suitable anode materials known in the art can be used for second electrode 16, for example, in "High Temperature Solid Oxide Fuel Cells: Fundamentals, Design and Applications," pp. 149-169, Dinghal, et al. Ed., Elsevier Ltd. (2003), the entire teachings of which are incorporated herein by reference. In one embodiment, second electrode 16 includes a nickel (Ni) cermet. As used herein, the phrase "Ni cermet" means a ceramic metal composite that includes Ni, such as about 20 wt %-70 wt % of Ni. Examples of Ni cermets are materials that include Ni and yttria-stabilized zirconia (YSZ), such as $ZrO_2$ containing about 15 wt % of $Y_2O_3$, and materials that include Ni and Y-zirconia or Sc-zirconia. An additional example of an anode material is Cu-cerium oxide. A specific example of an Ni cermet includes 67 wt % Ni and 33 wt % YSZ Typically, the thickness of each of first and second electrodes 14 and 16 is, independently, in a range of between about 0.5 mm and about 2 mm. Specifically, the thickness of each of first and second electrodes 14 and 16 is, independently, in a range of between about 1 mm and about 2 mm.

Solid electrolyte 22 is between first electrode 14 and second electrode 16. Any suitable solid electrolytes known in the art can be used in the invention, such as those described, in "High Temperature Solid Oxide Fuel Cells: Fundamentals, Design and Applications," pp. 83-112, Dinghal, et al. Ed., Elsevier Ltd. (2003), the entire teachings of which are incorporated herein by reference. Examples include $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and $CaO$-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.5}Co_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}Ga_3$ where A=Sr, Ca or Ba); and mixtures thereof. Other examples include doped yttrium-zirconate (e.g., $YZr_2O_7$), doped gadolinium-titanate (e.g., $Gd_2Ti_2O_7$) and brownmillerites (e.g., $Ba_2In_2O_6$ or $Ba_2In_2O_5$). In a specific embodiment, electrolyte 22 includes $ZrO_2$ doped with 8 mol % $Y_2O_3$ (i.e., 8 mol % $Y_2O_3$-doped $ZrO_2$.)

Typically, the thickness of solid electrolyte 22 is in a range of between about 5 μm and about 20 μm, such as between about 5 μm and about 10 μm. Alternatively, the thickness of solid electrolyte 22 is thicker than about 100 μm (e.g., between about 100 μm and about 500 100 μm). In this embodiment employing solid electrolyte 22 having a thickness greater than about 100 μm, solid electrolyte 22 can provide structural support for fuel cell 10.

Fuel cell 10 further includes interconnect 24 between cells 12. Referring to FIG. 1, in one embodiment, interconnect 24 has first surface 26 in contact with first electrode 14, and second surface 28 in contact with second electrode 16. Interconnect 24 consists essentially of a doped M-titanate based perovskite, wherein M is an alkaline earth metal. As used herein, the phrase "consists essentially of" means that interconnect 24 does not include any other metal oxides that may substantially affect the property of interconnect 24. Examples of suitable dopant materials include La, Y, Nb, Mn, V, Cr, W, Mo, Si, Sr, Ca, Mg, Ni, Co, V and Ti. In a specific embodiment, the M-titanate based perovskite is Sr-titante (e.g., $SrTiO_3$), Ca-titanate (e.g., $CaTiO_3$), Ba-titanate (e.g., $BaTiO_3$), or Mg-titanate (e.g., $MgTiO_3$). In another specific embodiment, the M-titanate based perovskite is n-doped, such as n-doped Sr-titanate or n-doped Ca-titanate. In yet another specific embodiment, the M-titanate based perovskite is a Sr-titanate doped with at least one dopant selected from the group consisting of La, Y, Nb, Mn, V, Cr, W, Mo and Si.

Figure 2:
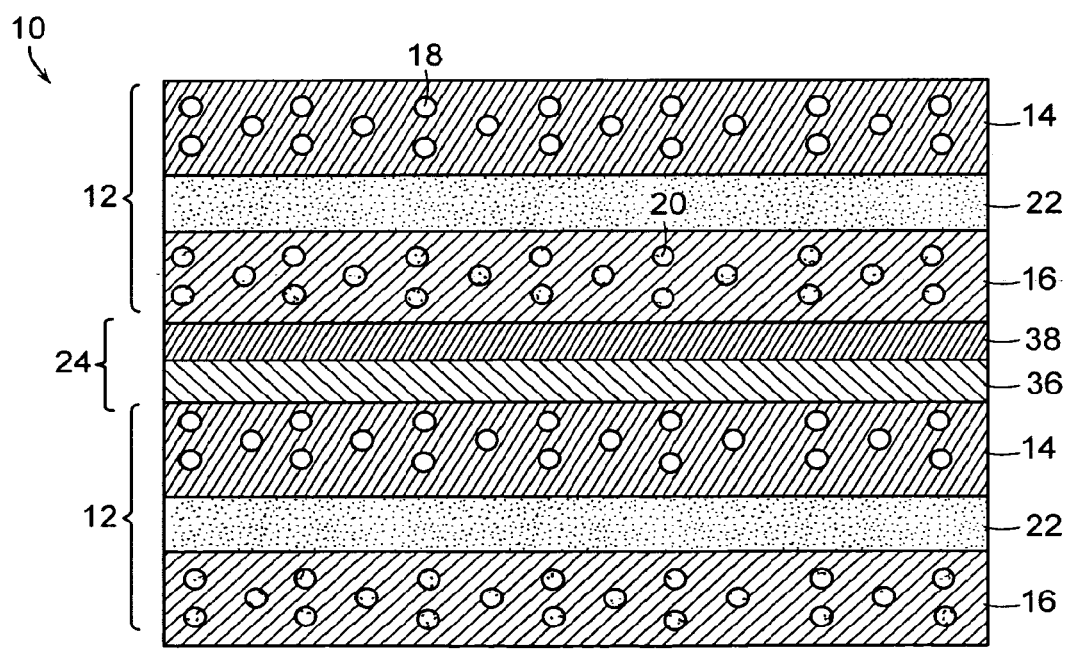
FIG. 2 is a schematic cross-sectional view of another embodiment of the invention.

In another embodiment, as shown in FIG. 2, interconnect 24 includes first layer 36 in contact with first electrode 14, and second layer 38 in contact with second electrode 16. First layer 36 includes an electrically conductive material selected from a metal, a metal alloy and a mixture thereof. Examples of the electrically conductive materials suitable for first layer 36 include Cr-based alloys, ferritic steels, Ni-based super alloys and Ni—Fe—$Y_2O_3$ alloys. Second layer 38 includes a doped M-titanate based perovskite, wherein M is an alkaline earth metal. Preferably, the material included in second layer 38 is n-doped. Examples of suitable dopant materials include La, Y, Nb, Mn, V, Cr, W, Mo, Si, Sr, Ca, Mg, Ni, Co, V and Ti. Suitable n-dopants include La, Y, Nb, Mn, V, Cr, W, Mo and Si. In a specific embodiment, the M-titanate based perovskite is Sr-titante (e.g., $SrTiO_3$), Ca-titanate (e.g., $CaTiO_3$), Ba-titanate (e.g., $BaTiO_3$), or Mg-titanate (e.g., $MgTiO_3$). In another specific embodiment, the M-titanate based perovskite is n-doped, such as n-doped Sr-titanate or n-doped Ca-titanate. In yet another specific embodiment, the M-titanate based perovskite is a Sr-titanate doped with at least one dopant selected from the group consisting of La, Y, Nb, Mn, V, Cr, W, Mo and Si.

M-titanate based perovskite has the perovskite structure known in the art, for example, in "High Temperature Solid Oxide Fuel Cells: Fundamentals, Design and Applications," pp. 120-123, Dinghal, et al. Ed., Elsevier Ltd. (2003), the entire teachings of which are incorporated herein by reference. The perovskite structure is adopted by many oxides that have the chemical formula $ABO_3$. The general crystal structure is a primitive cube with the A-cation in the center of a unit cell, the B-cation at the corners of the unit cell, and the anion (i.e., $O^{2-}$) at the centers of each edge of the unit cell. The idealized structure is a primitive cube, but differences in ratio between the A and B cations can cause a number of different so-called distortions, of which tilting is the most common one. As used herein, the phrase "M-titanate based perovskite" also includes such distortions. In the "M-titanate based perovskites," M atoms generally occupy the A-cation sites, while Ti atoms generally occupy the B-cation sites Interconnect 24 can be in any shape, such as a planar shape (see FIGS. 1 and 2) or a microstructured (e.g., grooved) shape (see FIG. 3). In one specific embodiment, at least one interconnect 24 of fuel cell 10 is substantially planar.

In one embodiment, the thickness of interconnect 24 is in a range of between about 10 μm and about 1,000 μm. Alternatively, the thickness of interconnect 24 is in a range of between about 0.005 mm and about 2.0 mm. In one specific embodiment, the thickness of interconnect 24 is in a range of 10 μm and about 500 μm. In another embodiment, the thickness of interconnect 24 is in a range of 10 μm and about 200 μm. In yet another embodiment, the thickness of interconnect 24 is between about 10 μm and about 100 μm. In yet another embodiment, the thickness of interconnect 24 is between about 10 μm and about 75 μm. In yet another embodiment, the thickness of interconnect 24 is between about 15 μm and about 65 μm.

In one specific embodiment, first electrode 14 and/or second electrode 16 has a thickness of between about 0.5 mm and about 2 mm thick, more specifically between about 1 mm and about 2 mm thick; and interconnect 24 has a thickness of between about 10 μm and about 200 μm, specifically between about 10 μm and about 200 μm, and more specifically between about 10 μm and about 100 μm.

In another specific embodiment, second layer 28 includes a SrLa-titanate based perovskite described above; and interconnect 24 has a thickness of between about 10 μm and about 100 μm, specifically between about 10 μm and about 75 μm, and more specifically between about 15 μm and about 65 μm.

In yet another specific embodiment, at least one cell 12 includes porous first and second electrodes 14 and 16, each of which is between about 0.5 mm and about 2 mm thick, more specifically between about 1 mm and about 2 mm thick; solid electrolyte 22 has a thickness of between about 5 μm and about 20 μm; and interconnect 24 is substantially planar and has a thickness of between about 10 μm and about 200 μm.

In yet another specific embodiment, interconnect 24 is substantially planar; each of first and second electrodes 14 and 16 is porous; and first electrode 14 includes a La-manganate or La-ferrite based material (e.g., $La_{1-k}Sr_kMnO_3$ or $La_{1-q}Sr_qCo_jFe_{1-j}O_3$, wherein values of each of k, l and j independently are as described above), and second electrode 16 includes a Ni cermet (e.g., 67 wt % Ni and 33 wt % YSZ). In one aspect of this specific embodiment, electrolyte 22 includes 8 mol % $Y_2O_3$-doped $ZrO_2$.

In yet another specific embodiment, first electrode 14 includes $(La_{0.8}Sr_{0.2})_{0.98}MnO_{3+\delta}$ or $La_{0.6}Sr_{0.4}Co_{0.2}Fe_{0.8}O_3$; and second electrode 16 includes 67 wt % Ni and 33 wt % YSZ. In this embodiment, specifically, electrolyte 22 includes 8 mol % $Y_2O_3$-doped $ZrO_2$.

Fuel cell 10 of the invention can include any suitable number of a plurality of sub-cells 12. In one embodiment, fuel cell 10 of the invention includes at least 30-50 sub-cells 12. Sub-cells 12 of fuel cell 10 can be connected in series or in parallel.

A fuel cell of the invention can be a planar stacked fuel cell, as shown in FIG. 3. Alternatively, as shown in FIG. 4, a fuel cell of the invention can be a tubular fuel cell. Fuel cells shown in FIGS. 3 and 4 independently have the characteristics, including specific variables, as described for fuel cell 10 shown in FIGS. 1 and 2 (for clarity, details of cell components are not depicted in FIGS. 3 and 4). Typically, in the planar design, as shown in FIG. 3, the components are assembled in flat stacks, with air and fuel flowing through channels built into the interconnect. Typically, in the tubular design, as shown in FIG. 4, the components are assembled in the form of a hollow tube, with the cell constructed in layers around a tubular cathode; air flows through the inside of the tube and fuel flows around the exterior.

The invention also includes a method of forming fuel cells as described above. The method includes forming a plurality of sub-cells 12 as described above, and connecting each sub-cell 12 with interconnect 24. Fabrication of sub-cells 12 and interconnect 24 can employ any suitable techniques known in the art, for example, in "High Temperature Solid Oxide Fuel Cells: Fundamentals, Design and Applications," pp. 83-225, Dinghal, et al. Ed., Elsevier Ltd. (2003), the entire teachings of which are incorporated herein by reference. For example, planar stacked fuel cells of the invention can be fabricated by particulate processes or deposition processes. Tubular fuel cells of the invention can be fabricated by having the cell components in the form of thin layers on a porous cylindrical tube, such as calcia-stabilized zirconia.

Typically, a suitable particulate process, such as tape casting or tape calendering, involves compaction of powders, such as ceramic powders, into fuel cell components (e.g., electrodes, electrolytes and interconnects) and densification at elevated temperatures. For example, suitable powder materials for electrolytes, electrodes or interconnects of the invention, are made by solid state reaction of constituent oxides. Suitable high surface area powders can be precipitated from nitrate and other solutions as a gel product, which are dried, calcined and comminuted to give crystalline particles. The deposition processes can involve formation of cell components on a support by a suitable chemical or physical process. Examples of the deposition include chemical vapor deposition, plasma spraying and spray pyrolysis.

In one specific embodiment, interconnect 24 consists essentially of a doped M-titanate based perovskite, and is prepared by disposing a material of a doped M-titanate based perovskite over either electrode 14 or 16, and sintering the material to form interconnect 24. Generally, the material of a doped M-titanate based perovskite is disposed at a temperature in a range of between about 50° C. and about 80° C. with a loading of between about 5 and about 50 tons. Generally, the material of a doped M-titanate based perovskite is sintered to form interconnect 24 having a high theoretical density (e.g., greater than about 90% theoretical density, or greater than about 95% theoretical density).

In another specific embodiment, interconnect 24 includes first layer 36 and second layer 38, and is formed by depositing an electrically conductive material over electrode 14 using any suitable deposition method known in the art, such as chemical vapor deposition to from first layer 36, and disposing a material of a doped M-titanate based perovskite over first layer 36. Generally, the material of a doped M-titanate based perovskite is disposed at a temperature in a range of between about 50° C. and about 80° C. with a loading of between about 5 and about 50 tons. Generally, the material of a doped M-titanate based perovskite is sintered to form interconnect 24 having a high theoretical density (e.g., greater than about 90% theoretical density, or greater than about 95% theoretical density).

The SOFCs of the invention can be portable. Also, the SOFCs of the invention, can be employed as a source of electricity in homes, for example, to generate hot water.

EQUIVALENT

While this invention has been particularly shown and described with references to example embodiments thereof, it will be understood by those skilled in the art that various changes in form and details may be made therein without departing from the scope of the invention encompassed by the appended claims.

What is claimed is:

1. A solid oxide fuel cell, comprising:
   a) a plurality of sub-cells, each sub-cell including:
      i) a first electrode in fluid communication with a source of oxygen gas;
      ii) a second electrode in fluid communication with a source of a fuel gas; and
      iii) a solid electrolyte between the first electrode and the second electrode; and
   b) an interconnect between the sub-cells, the interconnect having a first layer that is bonded to the first electrode of each sub-cell and a second layer that is bonded to and in direct contact with the second electrode of each sub-cell, the first and second layers being in direct contact with each other and substantially parallel to each other, and forming a planar stack of sub-cells, stacked one on top of another,
   wherein the second layer comprises Sr-titanate ($SrTiO3$) with an n-dopant including La, and the second layer does not include Cr,
   wherein the first layer is a metal or metal alloy, and
   wherein the interconnect has a thickness in a range of 10 μm to about 200 μm.

2. The solid oxide fuel cell of claim 1, wherein the second layer consists essentially of $SrTiO_3$ with a La dopant.

3. The solid oxide fuel cell of claim 1, wherein each sub-cell further includes a first gas channel in fluid communication with the oxygen gas source and with the first electrode, and a second gas channel in fluid communication with the fuel gas source and with the second electrode.

4. The solid oxide fuel cell of claim 3, wherein the first electrode at least in part defines the first gas channel, and the second electrode at least in part defines the second gas channel.

5. The solid oxide fuel cell of claim 1, wherein each of the first and second electrodes is porous.

6. The solid oxide fuel cell of claim 1, wherein the Sr-titanate ($SrTiO_3$) with an n-dopant including La further comprises at least one additional n-dopant selected from the group consisting of Y, Nb, Mn, V, W, Mo, and Si.

7. The solid oxide fuel cell of claim 1, wherein the solid electrolyte includes at least one material selected from the group consisting of $ZrO_2$ based material, $CeO_2$ based material and lanthanide-gallate based material.

8. The solid oxide fuel cell of claim 1, wherein the first electrode includes a La-manganate based material.

9. The solid oxide fuel cell of claim 1, wherein the second electrode includes a nickel cermet.

10. The solid oxide fuel cell of claim 1, wherein the thickness of each of the first and second electrodes of at least one of the cells is in a range of between 1 mm and 2 mm.

11. The solid oxide fuel cell of claim 1, wherein the sub-cells are connected with each other in series.

12. The solid oxide fuel cell of claim 1, wherein the interconnect is substantially planar.

13. The solid oxide fuel cell of claim 1, wherein the interconnect includes channels built into the first surface to receive the oxygen gas.

14. The solid oxide fuel cell of claim 13, wherein the interconnect includes channels built into the second surface to receive the fuel gas.

15. A method of forming a solid oxide fuel cell that includes a plurality of sub-cells, comprising the step of connecting each of the sub-cells with an interconnect, wherein each sub-cell includes:
   i) a first electrode in fluid communication with a source of oxygen gas,
   ii) a second electrode in fluid communication with a source of a fuel gas, and
   iii) a solid electrolyte between the first electrode and the second electrode,
   wherein the interconnect comprises a first layer that is bonded to the first electrode of each sub-cell and a second layer that is bonded to and in direct contact with the second electrode of each sub-cell, the first and second layers being in direct contact with each other and substantially parallel to each other, and forming a planar stack of sub-cells, stacked one on top of another,
   wherein the second layer comprises Sr-titanate ($SrTiO3$) with an n-dopant including La, and the second layer does not include Cr,
   wherein the first layer is a metal or metal alloy, and
   wherein the interconnect has a thickness in a range of 10 μm to 200 μm.

16. The method of claim 15, wherein the density of the interconnect is greater than 90 percent theoretical density.

17. The method of claim 16, wherein the density of the interconnect is greater than about 95 percent theoretical density.

18. The solid oxide fuel cell of claim 1, wherein the interconnect has a thickness in a range of 10 μm to 100 μm.

19. The solid oxide fuel cell of claim 1, wherein the interconnect has a thickness in a range of 10 μm to 65 μm.

* * * * *